US012686131B2

(12) United States Patent
Sugawara et al.

(10) Patent No.: US 12,686,131 B2
(45) Date of Patent: Jul. 21, 2026

(54) ROBOT SYSTEM AND ROBOT CONTROL DEVICE

(71) Applicant: Hitachi, Ltd., Tokyo (JP)

(72) Inventors: Toshiharu Sugawara, Tokyo (JP); Toshiaki Nakamura, Tokyo (JP); Gyanendra Nath Tripathi, Tokyo (JP); Shoichi Handa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 71 days.

(21) Appl. No.: 18/713,115

(22) PCT Filed: Oct. 28, 2022

(86) PCT No.: PCT/JP2022/040384
§ 371 (c)(1),
(2) Date: May 23, 2024

(87) PCT Pub. No.: WO2023/095546
PCT Pub. Date: Jun. 1, 2023

(65) Prior Publication Data
US 2025/0026017 A1    Jan. 23, 2025

(30) Foreign Application Priority Data

Nov. 25, 2021    (JP) ................................. 2021-191123

(51) Int. Cl.
B25J 9/00        (2006.01)
B25J 5/00        (2006.01)
B25J 9/16        (2006.01)
(52) U.S. Cl.
CPC ............. B25J 9/1682 (2013.01); B25J 5/007 (2013.01); B25J 9/1676 (2013.01); G05B 2219/39001 (2013.01); G05B 2219/40519 (2013.01)

(58) Field of Classification Search
CPC ........ B25J 9/1682; B25J 5/007; B25J 9/1676; B25J 9/1666; B25J 13/00; B25J 19/06; G05B 2219/39001; G05B 2219/40519
See application file for complete search history.

(56) References Cited

U.S. PATENT DOCUMENTS

2011/0066282 A1*  3/2011  Bosscher ............... B25J 9/1676
                                                        700/255
2020/0094411 A1*  3/2020  Tan ........................ B25J 9/1661
(Continued)

FOREIGN PATENT DOCUMENTS

JP        63-207578 A      8/1988
JP        2000-042958 A    2/2000
(Continued)

OTHER PUBLICATIONS

International Search Report issued in PCT Application No. PCT/JP2022/040384 dated Dec. 27, 2022, with English Translation.

*Primary Examiner* — Khoi H Tran
*Assistant Examiner* — Tien Minh Le
(74) *Attorney, Agent, or Firm* — Foley & Lardner LLP

(57) ABSTRACT

A robot system including a first robot and a second robot carrying out a coordinated operation, a first robot control device, a second robot control device, and a sensor, wherein each of the first and second robot control devices include a trajectory planning unit for planning an action, a control unit for executing the action, a collision prediction unit for predicting a collision and an external disturbance based on information from the sensor, and an interlocking-preventing unit, wherein a first interlocking-preventing unit of the first robot generates an avoiding trajectory and transmits the avoiding trajectory to a second interlocking-preventing unit when the first collision prediction unit predicts a collision
(Continued)

with the external disturbance; and the first and second robots carry out actions to avoid the external disturbance.

9 Claims, 12 Drawing Sheets

(56)                    References Cited

U.S. PATENT DOCUMENTS

| | | | |
|---|---|---|---|
| 2020/0398428 A1* | 12/2020 | Murray | ................. B25J 9/1605 |
| 2022/0080582 A1* | 3/2022 | Sekimoto | .................. B25J 9/10 |
| 2022/0410889 A1* | 12/2022 | Busse | ................ B60W 40/105 |

FOREIGN PATENT DOCUMENTS

| | | |
|---|---|---|
| JP | 2006-000954 | 1/2006 |
| JP | 2010-172990 A | 8/2010 |
| JP | 2011-056607 A | 3/2011 |
| JP | 2019-206080 A | 12/2019 |
| WO | WO-2008/031664 A1 | 3/2008 |

* cited by examiner

Figure 5:
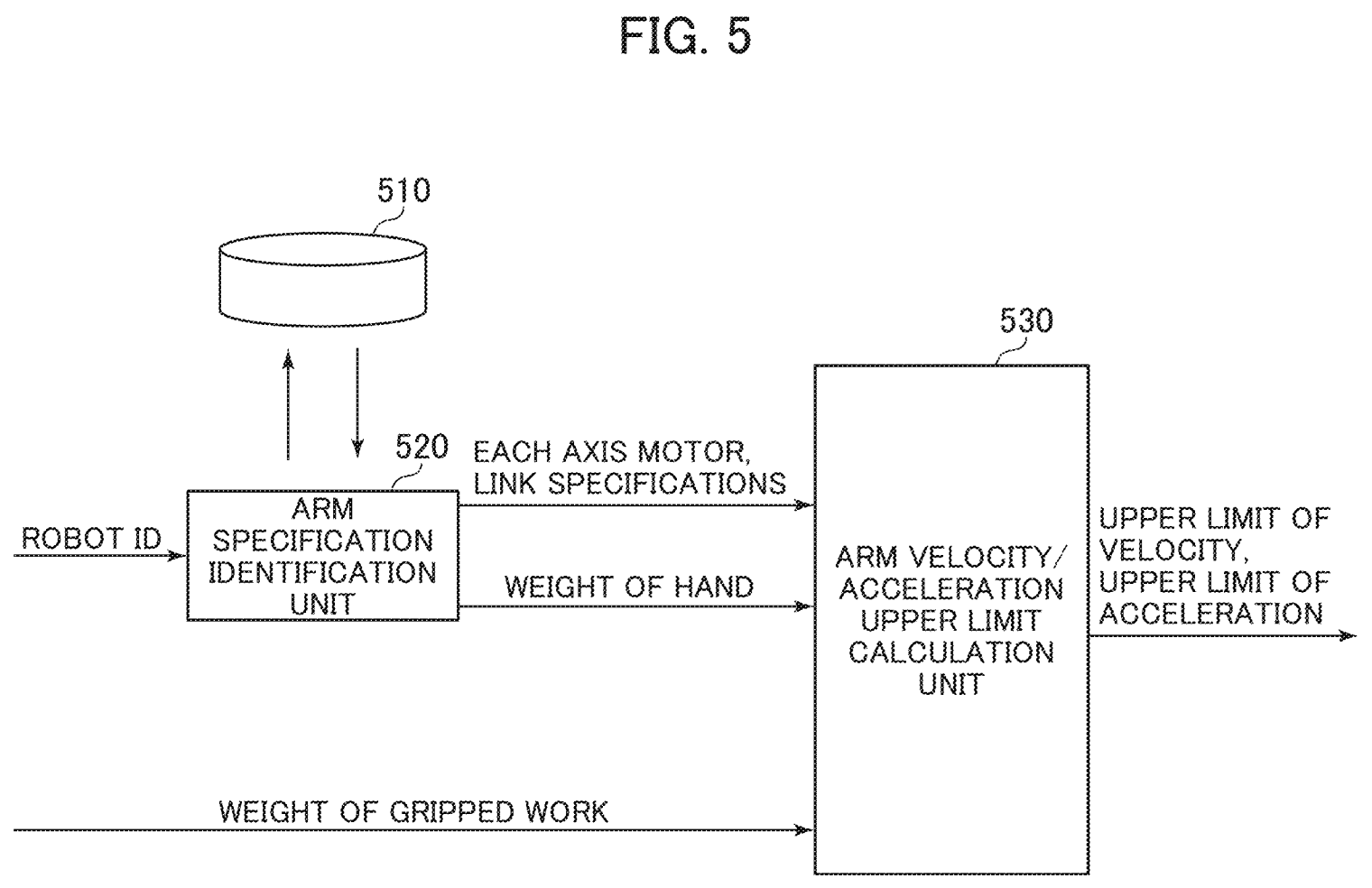

520    ARM
SPECIFICATION
IDENTIFICATION
UNIT

530    ARM VELOCITY/
ACCELERATION
UPPER LIMIT
CALCULATION
UNIT

ROBOT ID

EACH AXIS MOTOR,
LINK SPECIFICATIONS

WEIGHT OF HAND

WEIGHT OF GRIPPED WORK

UPPER LIMIT OF
VELOCITY,
UPPER LIMIT OF
ACCELERATION

TIME

A

601

~S610
RISK OF
COLLISION IS HIGH

~S620
ESTIMATE UPPER
LIMIT OF
ACCELERATION OF
PARTNER

~S630
GENERATE
TRAJECTORY FOR
STOPPING HAND

~S640
GENERATE
COMMAND
REGARDING
JOINT ANGLE

~S650
CONTROL TO
STOP

B

~S635
GENERATE
TRAJECTORY FOR
STOPPING HAND

~S645
GENERATE
COMMAND
REGARDING
JOINT ANGLE

~S655
CONTROL TO
STOP

TIME

1201

A

B

S1210
RISK OF COLLISION IS HIGH

S1220
ESTIMATE UPPER LIMIT OF ACCELERATION OF PARTNER

S1230
GENERATE TRAJECTORY FOR STOPPING LOADING PORTION

S1240
GENERATE COMMAND REGARDING ROTATION ANGLES OF WHEELS

S1250
CONTROL TO STOP

S1235
GENERATE TRAJECTORY FOR STOPPING LOADING PORTION

S1245
GENERATE COMMAND REGARDING ROTATION ANGLES OF WHEELS

S1255
CONTROL TO STOP

ROBOT SYSTEM AND ROBOT CONTROL DEVICE

TECHNICAL FIELD

This disclosure relates to a robot system and a robot control device.

BACKGROUND ART

The introduction of autonomous control robots is progressing, and there is a need to expand the scope of the application.

Patent Literature 1 discloses a multi-robot system including a plurality of robots, a monitoring system that monitors operations of the robots, and an overall controller that operates the multi-robot, and operates cooperatively to achieve a specific purpose as a whole. The overall controller instructs, based on states of the robots and monitored positions and directions, the robots to operate, instructs the robots to correct the positions and the directions, and instructs the robots to operate upon the occurrence (or prediction) of an abnormality via a wireless LAN in real time.

Patent Literature 2 discloses that, in order to control an operation of a robot to obtain high work efficiency while securing safety of a worker, a trajectory correction unit of a robot control device sets, as an instructed trajectory, a corrected trajectory candidate selected based on time to reach a target position and a possibility of collision when it is determined that it is necessary to correct a trajectory, and sets, as an instructed trajectory, a trajectory from a current position toward a target position when it is determined that it is not necessary to correct the trajectory.

CITATION LIST

Patent Literature

Patent Literature 1

Japanese Unexamined Patent Application Publication No. 2006-954

Patent Literature 2

Japanese Unexamined Patent Application Publication No. 2019-206080

SUMMARY OF INVENTION

Technical Problem

In control of a plurality of robots that perform a cooperative operation, it is required not only to improve efficiency but also secure safety.

For example, in a case where a plurality of robots perform a cooperative operation at a location where a worker (human) comes and goes and where a safety fence is not present, when the worker enters a trajectory of the robots, and one of the robots performs change of the trajectory, for example, of such as an emergency stop, a failure may occur, for example, a conveyance target object gripped by the robot together with another robot may drop or may be damaged, or the robot may fall.

The multi-robot system described in Patent Literature 1 has a function of correcting a part of formation and securing a region for a robot in an abnormal state to be recovered when the robot is in the abnormal state and interference with another robot is predicted during the recovery operation. However, it does not describe transmission of correction data that requests another robot to cooperate.

The robot control device described in Patent Literature 2 is configured to estimate a possibility that a single robot collides with a worker (human). Therefore, it does not describe transmission of correction data that requests another robot to cooperate in a case where a plurality of robots are controlled.

An object of the present disclosure is to prevent a failure from occurring when a robot's operation is suddenly changed due to a disturbance or the like in a case where a plurality of robots perform a cooperative operation.

Solution to Problem

A robot system of this disclosure includes: a first robot; a second robot; a first robot control device that controls the first robot; a second robot control device that controls the second robot; and a sensor, the first robot and the second robot performing a cooperative operation. In the robot system, the first robot control device includes: a first trajectory planning unit that plans an operation of the first robot; a first control unit that performs the planned operation of the first robot; a first collision prediction unit that predicts, based on information of the sensor, collision of the first robot or the second robot with a disturbance; and a first interlocking stop unit, and the second robot control device includes: a second trajectory planning unit that plans an operation of the second robot; a second control unit that performs the planned operation of the second robot; a second collision prediction unit that predicts, based on information of the sensor, the collision of the first robot or the second robot with the disturbance; and a second interlocking unit. When the first collision prediction unit predicts the collision with the disturbance, the first interlocking stop unit generates a disturbance avoidance trajectory of the first robot and transmits the disturbance avoidance trajectory to the second interlocking stop unit, and the first robot and the second robot perform an operation of avoiding the disturbance.

Advantageous Effects of Invention

According to the present disclosure, it is possible to prevent a failure from occurring when a robot's operation is suddenly changed due to a disturbance or the like in a case where a plurality of robots perform a cooperative operation.

BRIEF DESCRIPTION OF THE DRAWINGS

FIG. 5 is a configuration diagram illustrating means for calculating upper limits of velocities and of acceleration of arms in the interlocking stop units.

DESCRIPTION OF EMBODIMENTS

A robot system and a robot control device used for the robot system according to the present disclosure can be applied to construction machinery, in-factory logistics, production equipment assembly, and the like.

Hereinafter, embodiments of the invention will now be described with reference to the drawings.

First Embodiment

Figure 1:
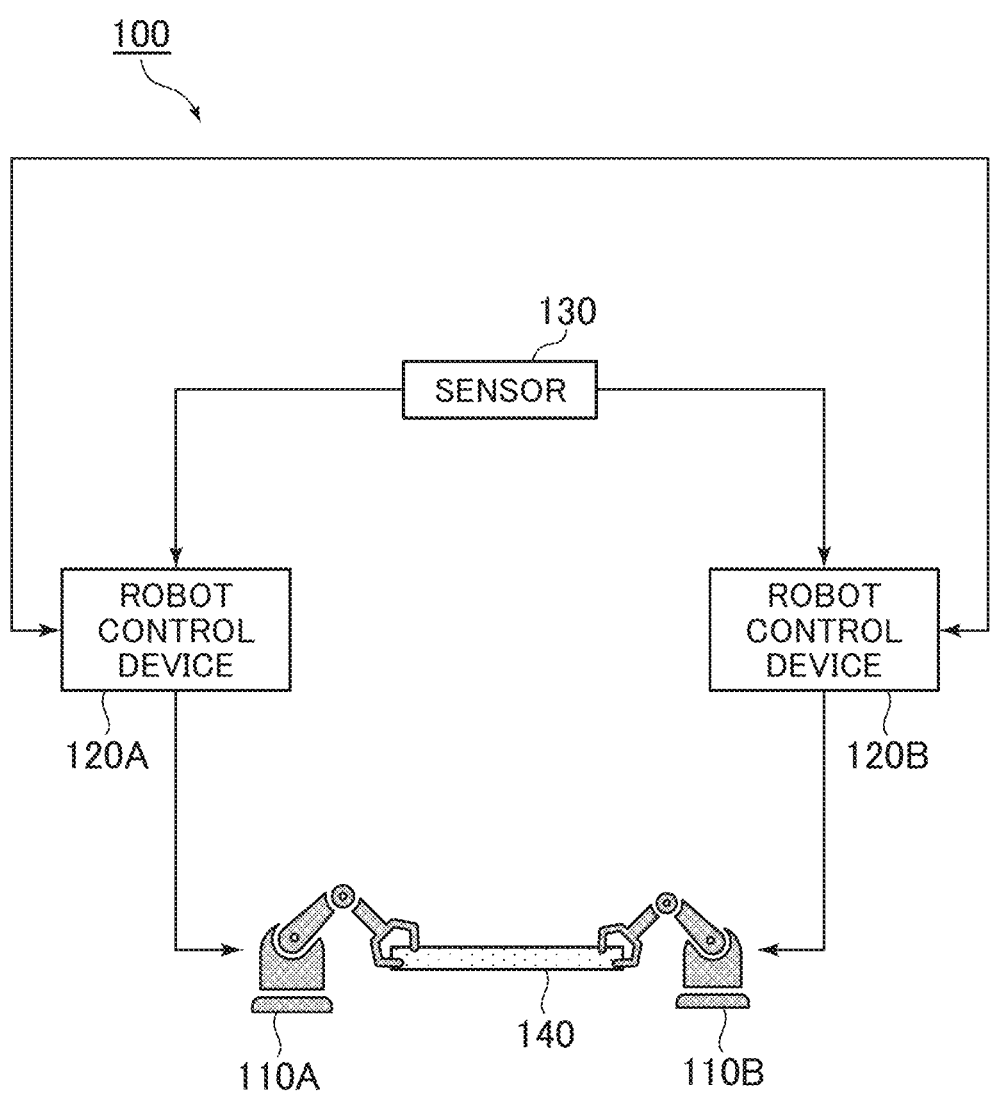
FIG. 1 is a schematic configuration diagram illustrating a robot system according to a first embodiment.

FIG. 1 is a schematic configuration diagram illustrating a robot system according to a first embodiment.

In the drawing, the robot system 100 includes a first robot 110A, a second robot 110B, a robot control device 120A (first robot control device) that controls the first robot 110A, a robot control device 120B (second robot control device) that controls the second robot 110B, and a sensor 130.

The sensor 130 is installed separately from the first robot 110A and the second robot 110B. For example, the sensor 130 is a camera or the like installed on a ceiling, a wall, or the like in a room in which the first robot 110A and the second robot 110B perform an operation.

The first robot 110A and the second robot 110B cooperate with each other to move a conveyance target object 140. In this case, the first robot 110A and the second robot 110B grip both end portions and the like of the conveyance target object 140 by gripping portions of the robots. Each of the first robot 110A and the second robot 110B has a manipulator having a joint portion. The gripping portions can be moved by the manipulators.

The robot control device 120A and the robot control device 120B are configured to be able to transmit and receive data and the like to and from each other. In addition, the robot control device 120A and the robot control device 120B can receive data or the like obtained by the sensor 130.

Although the drawing illustrates a case where the robot control devices are disposed outside the robots, the robot control devices may be disposed in the robots.

Each of the robot control devices includes an input unit, an output unit, an arithmetic unit, and a storage unit. The arithmetic units are central processing units (CPUs) or the like of computers. The storage units may include a database.

Figure 2:
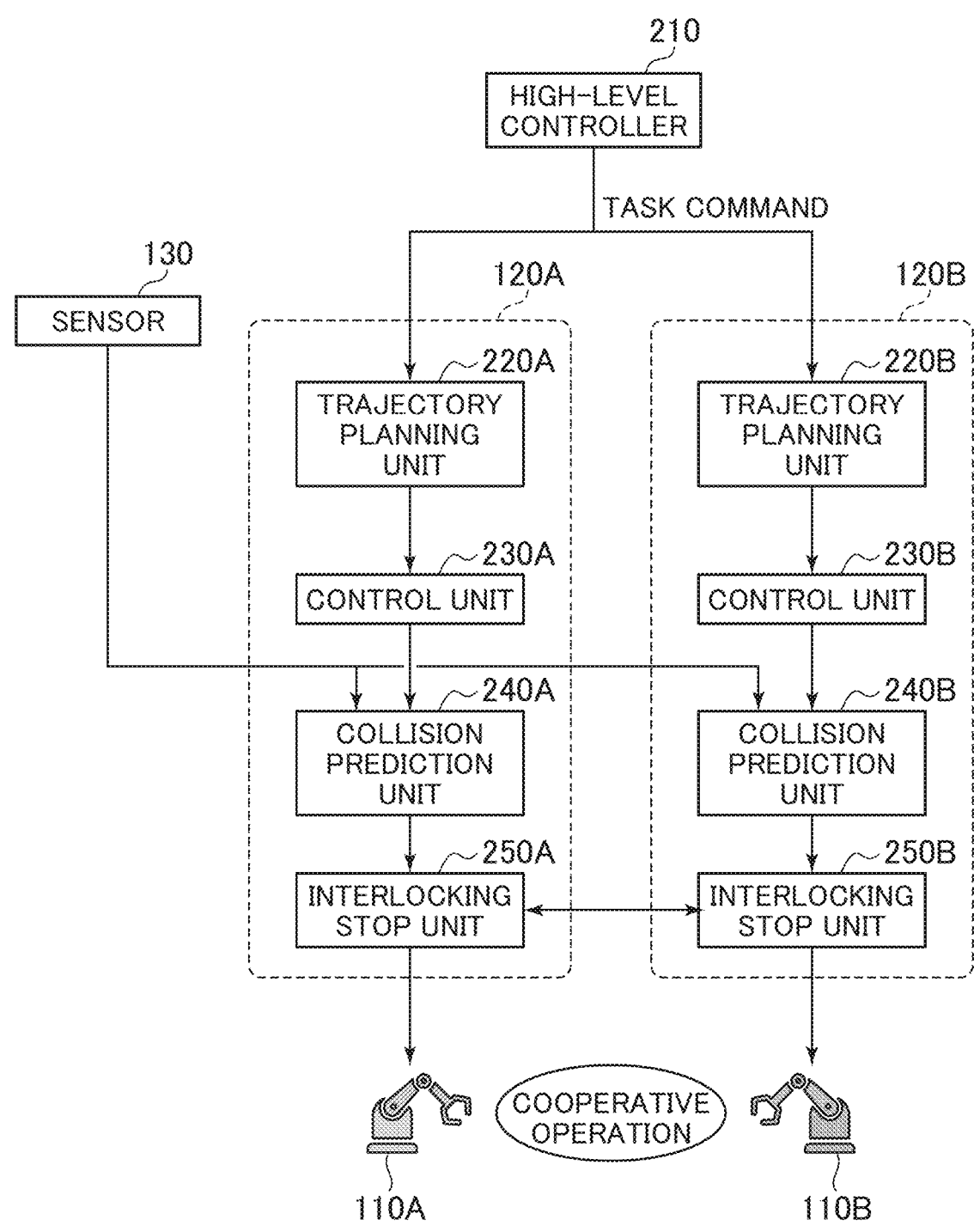
FIG. 2 is a configuration diagram illustrating robot control devices according to the first embodiment.

FIG. 2 is a configuration diagram illustrating robot control devices according to the first embodiment.

As illustrated in the drawing, the robot control device 120A includes a trajectory planning unit 220A (first trajectory planning unit), a control unit 230A (first control unit), a collision prediction unit 240A (first collision prediction unit), and an interlocking stop unit 250A (first interlocking stop unit). Similarly, the robot control device 120B includes a trajectory planning unit 220B (second trajectory planning unit), a control unit 230B (second control unit), a collision prediction unit 240B (second collision prediction unit), and an interlocking stop unit 250B (second interlocking stop unit).

The trajectory planning units 220A and 220B receive a task command from a high-level controller 210. The trajectory planning unit 220A creates, based on the task command, a program or the like regarding an operation of the first robot 110A, and transmits the program or the like to the control unit 230A. The control unit 230A controls an operation of the first robot 110A based on the program or the like. Similarly, the trajectory planning unit 220B creates, based on the task command, a program or the like regarding an operation of the second robot 110B, and transmits the program or the like to the control unit 230B. The control unit 230B controls an operation of the second robot 110B based on the program or the like.

The trajectory planning units 220A and 220B may autonomously create the programs or the like as described above and prepare and store the programs or the like in advance.

The collision prediction unit 240A receives the program or the like from the control unit 230A and receives information indicating actual operations of the first robot 110A and the second robot 110B, situations around the first robot 110A and the second robot 110B, a disturbance or the like such as approach of a human. Similarly, the collision prediction unit 240B receives the program or the like from the control unit 230B and receives information indicating the actual operations of the first robot 110A and the second robot 110B, the situations around the first robot 110A and the second robot 110B, the disturbance or the like such as the approach of the human.

Then, when the collision prediction units 240A and 240B determine that it is necessary to perform change, stop, or the like of trajectories of the first robot 110A and the second robot 110B, in order to avoid the disturbance or the like, the collision prediction unit 240A transmits the result of the determination to the interlocking stop unit 250A, and the collision prediction unit 240B transmits the result of the determination to the interlocking stop unit 250B. The interlocking stop unit 250A transmits a command of change, stop, or the like of the trajectory, to the first robot 110A in accordance with the result of the determination. Similarly, the interlocking stop unit 250B transmits a command of change, stop, or the like of the trajectory to the second robot 110B in accordance with the result of the determination.

The first robot 110A and the second robot 110B that have received the command cooperate with each other to avoid dropping of the conveyance target object 140 (FIG. 1), damage to the conveyance target object 140, and the like, and perform operation of change, stop or the like of the trajectories.

Figure 3:
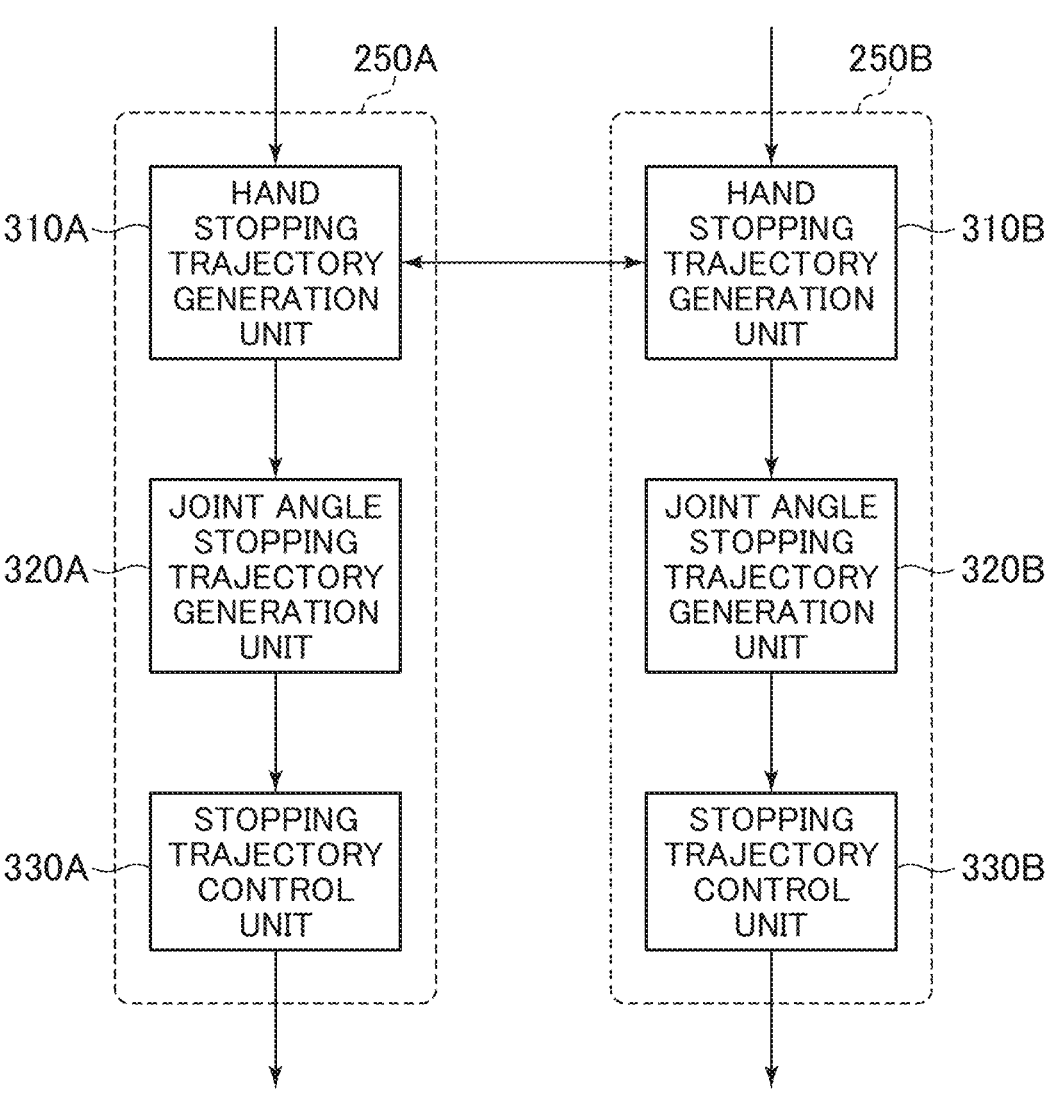
FIG. 3 is a configuration diagram illustrating interlocking stop units illustrated in FIG. 2.

FIG. 3 is a configuration diagram illustrating interlocking stop units illustrated in FIG. 2.

As illustrated in FIG. 3, the interlocking stop unit 250A includes a hand stopping trajectory generation unit 310A, a joint angle stopping trajectory generation unit 320A, and a stopping trajectory control unit 330A. Similarly, the interlocking stop unit 250B includes a hand stopping trajectory generation unit 310B, a joint angle stopping trajectory generation unit 320B, and a stopping trajectory control unit 330B. The hand stopping trajectory generation unit 310A and the hand stopping trajectory generation unit 310B can transmit and receive data to and from each other. Joint angles are angles of the joints of the manipulators, and are adjusted by motors of the joints of the manipulators.

The hand stopping trajectory generation unit 310A receives data such as the result of the determination from the collision prediction unit 240A (FIG. 2), and the hand stopping trajectory generation unit 310B receives data such as the result of the determination from the collision prediction unit 240B (FIG. 2).

Figure 4:
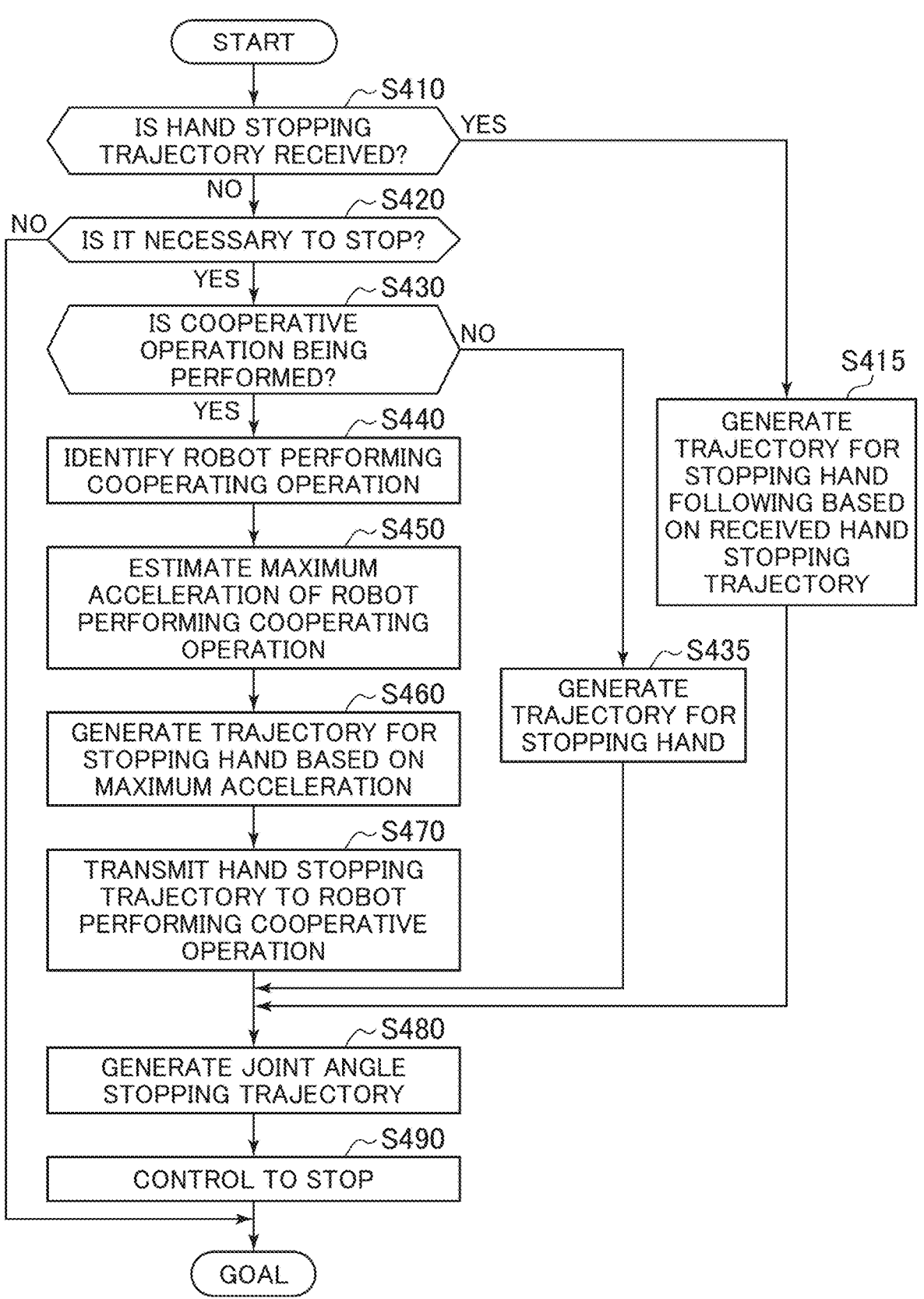
FIG. 4 is a flowchart illustrating a process by the interlocking stop units.

FIG. 4 is a flowchart illustrating a process by the interlocking stop units.

In the drawing, when any one of the interlocking stop units 250A and 250B receives the result of the determination, such as the change, stop, or the like of the trajectory of the robot, from the collision prediction unit 240A or 240B, the hand stopping trajectory generation unit 310A or 310B included in the interlocking stop unit 250A or 250B determines whether or not data or a program for a hand stopping trajectory is included in the result of the determination (step S410).

In a case where the data or the program for the hand stopping trajectory is not included, the hand stopping trajectory generation unit 310A or 310B determines whether or not it is necessary to stop the hand (step S420).

In a case where it is determined that it is necessary to stop the hand, the robot determines whether or not the robot is performing a cooperative operation (step S430). In this case, the cooperative operation is an operation in which two or more robots simultaneously grip a single object or the like to convey the object, or the like. In other words, the cooperative operation includes supporting of the conveyance target object.

In a case where it is determined that the cooperative operation is being performed, a robot (partner) performing the cooperative operation is identified (step S440). After that, the maximum acceleration of the identified robot is estimated (step S450). Then, a trajectory for stopping a hand is generated based on the maximum acceleration (step S460). In other words, a program for the trajectory for stopping the hand or the like is created.

A reason why the maximum acceleration of the partner robot is estimated is that, when it is not based on the maximum acceleration, the conveyance target object 140 may drop or the robot may fall.

The program or the like is transmitted to the other robot that is performing the cooperative operation, or to the robot control devices (step S470).

Next, each of the robots or each of the robot control devices uses the program or the like to generate a stopping trajectory for the joint angle (step S480).

After that, control to stop the robots is performed (step S490).

On the other hand, in a case where the data or the program for the hand stopping trajectory is included in step S410, a trajectory for stopping the hand of the other robot following is generated based on the received hand stopping trajectory (step S415). After that, the processing in steps S480 and S490 is performed.

In addition, in a case where it is determined that the cooperative operation is not being performed in step S430, a trajectory for stopping the hand of the robot is generated (step S435). After that, the processing in steps S480 and S490 is performed.

FIG. 5 is a configuration diagram illustrating means for calculating upper limits of velocities and of acceleration of arms in the interlocking stop units.

In the drawing, each of the interlocking stop units includes a storage device 510 having a database, an arm specification identification unit 520, and an arm velocity/acceleration upper limit calculation unit 530.

When the arm specification identification unit 520 receives a robot ID (a number or the like given to distinguish the robot), the arm specification identification unit 520 identifies, from the database of the storage device 510, specifications such as each axis motor, a link, and the like of the arm of the robot, the weight of the hand included in the arm, and the like. The identified information of the arm is transmitted to the arm velocity/acceleration upper limit calculation unit 530.

The arm velocity/acceleration upper limit calculation unit 530 uses the information, data of the weight of the work (conveyance target object 140 (FIG. 1)) gripped by the robot, and the like to calculate an upper limit of the velocity of the arm and an upper limit of the acceleration of the arm, and outputs the upper limits.

Figure 6:
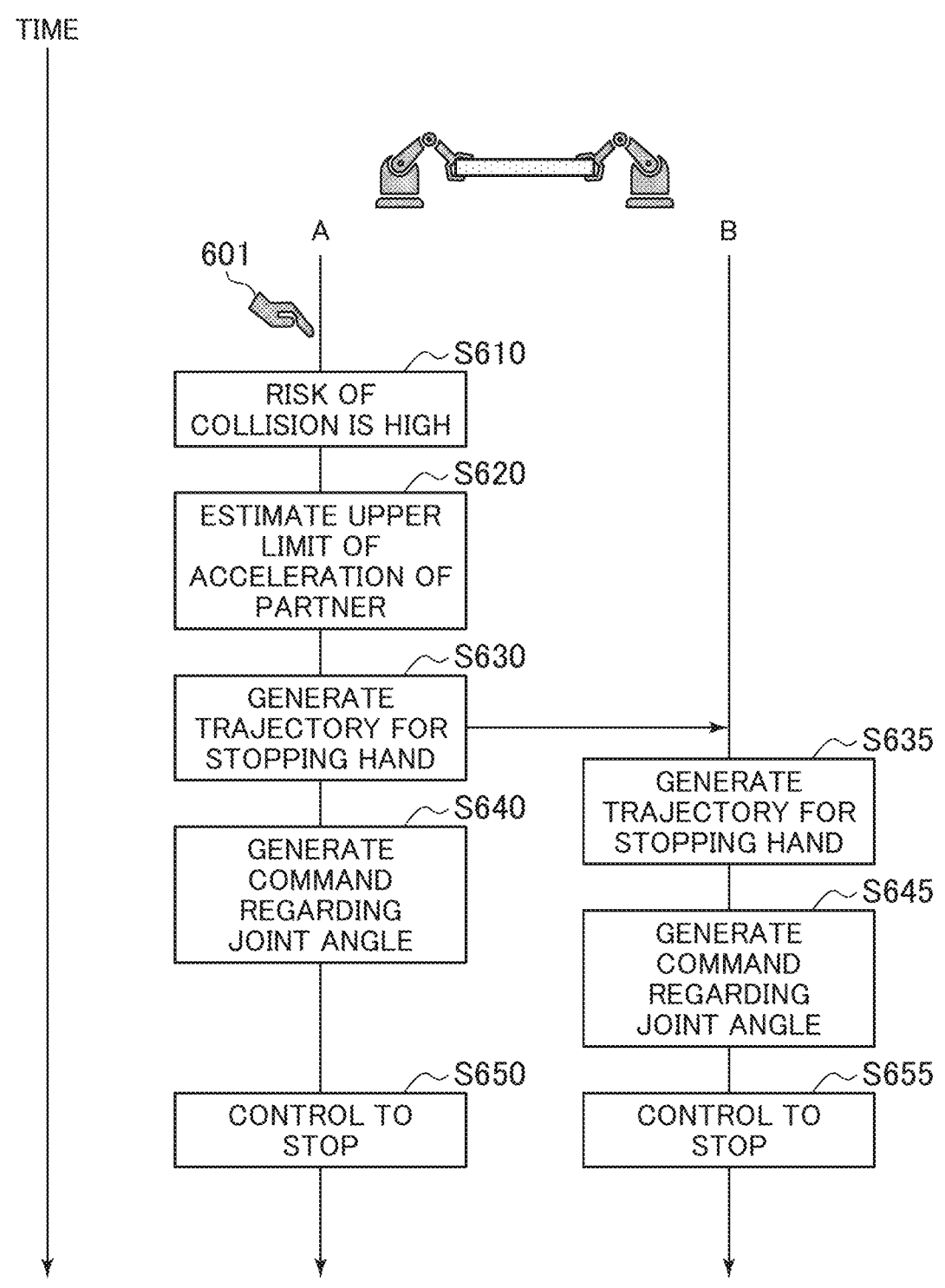
FIG. 6 is a flowchart illustrating a stop process when a disturbance occurs.

FIG. 6 is a flowchart illustrating a stop process when a disturbance occurs.

In the drawing, in a case where the collision prediction unit 240A determines that a risk of collision with a disturbance 601 is high (step S610), the interlocking stop unit 250A estimates the maximum value of acceleration of the robot (partner) performing a cooperative operation (step S620). Then, the hand stopping trajectory generation unit 310A generates a trajectory for stopping the hand of the first robot 110A and transmits data of the trajectory to the hand stopping trajectory generation unit 310B (step S630). It is desirable to slow down as quickly as possible. However, if the capacity of a motor or the like of the partner is not matched, the conveyance target object 140 may drop or the robot may fall.

The joint angle stopping trajectory generation unit 320A uses data of the generated trajectory for stopping the hand to generate a command regarding the joint angle and transmits the command to the stopping trajectory control unit 330A (step S640). The stopping trajectory control unit 330A performs control based on the trajectory for stopping the hand (step S650).

Meanwhile, the hand stopping trajectory generation unit 310B that has received the data generates a trajectory for stopping the hand of the second robot 110B (step S635).

The joint angle stopping trajectory generation unit 320B uses data of the generated trajectory for stopping the hand to generate a command regarding the joint angle and transmits the command to the stopping trajectory control unit 330B (step S645). The stopping trajectory control unit 330B performs control based on the trajectory for stopping the hand (step S655).

Figure 7:
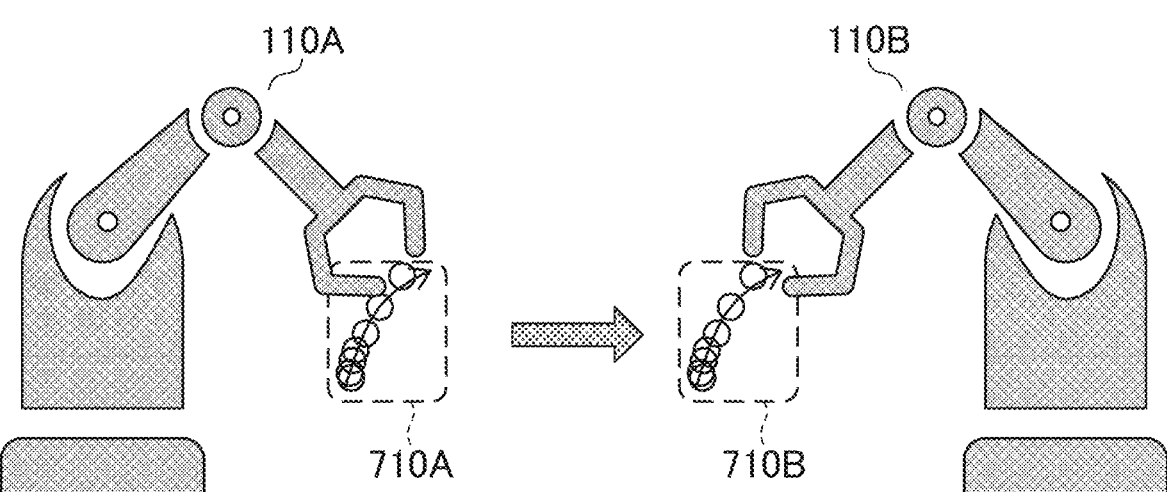
FIG. 7 is a schematic diagram illustrating a state in which two robots operate cooperatively.

FIG. 7 is a schematic diagram illustrating a state in which two robots operate cooperatively.

In the drawing, the hand of the first robot 110A moves as shown in a trajectory 710A. Meanwhile, the hand of the second robot 110B moves along a trajectory 710B having the same shape as that of the trajectory 710A. This is implemented by the first robot 110A or the robot control device for the first robot 110A transmitting data of the trajectory 710A to the second robot 110B or the robot control device for the second robot 110B. It is desirable that the data be point sequence data at each time point as indicated by the trajectories 710A and 710B. This is because, in the case of an emergency stop, the point sequence data can be processed within a shorter period.

Figure 8:
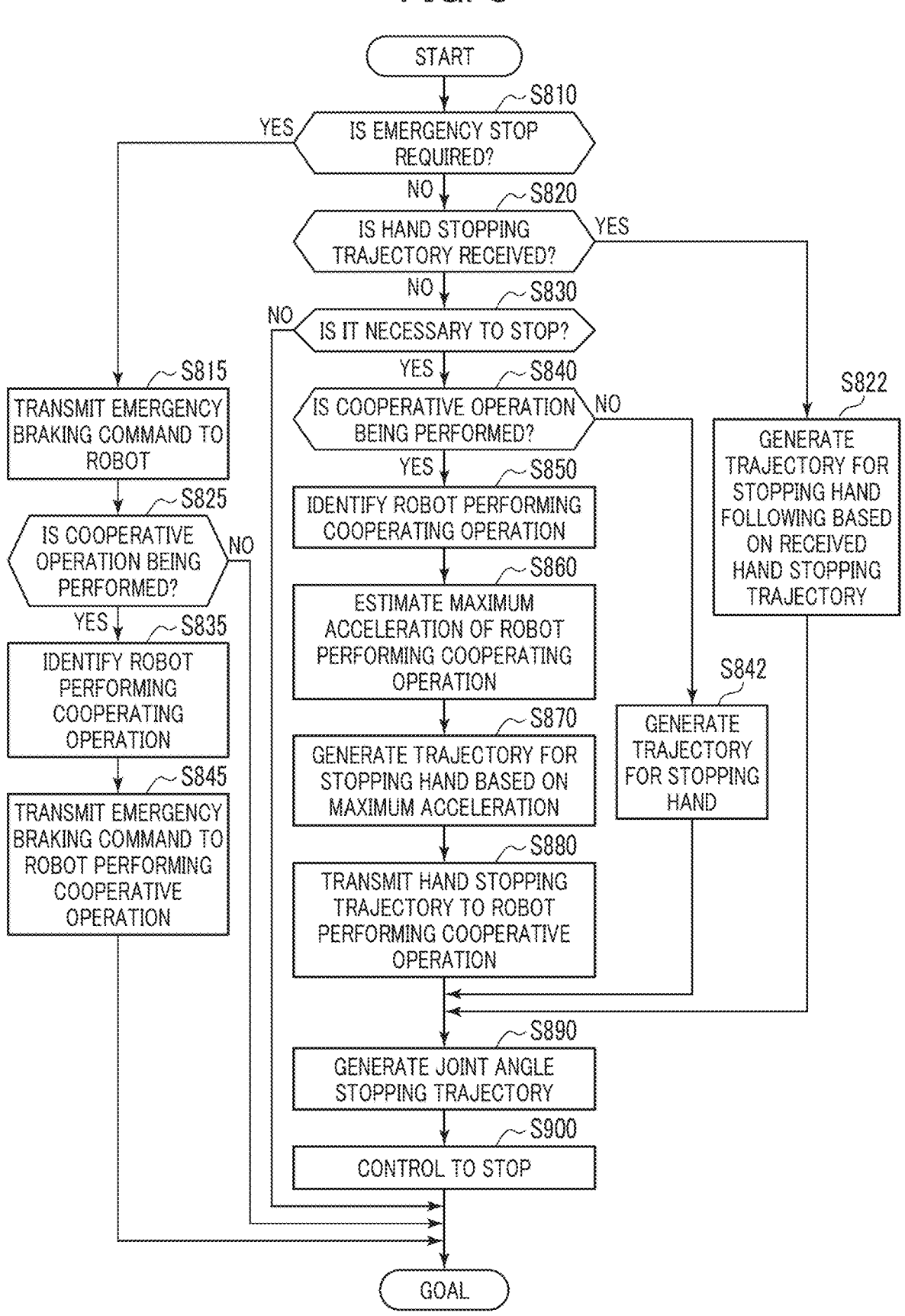
FIG. 8 is a flowchart illustrating a process by the interlocking stop units for an emergency stop.

FIG. 8 is a flowchart illustrating a process by the interlocking stop units for an emergency stop.

In the drawing, in addition to the steps illustrated in FIG. 4, steps for an emergency stop are provided.

That is, in FIG. 8, whether or not an emergency stop is required is determined first (step S810).

In a case where it is determined that the emergency stop is required in step S810, an emergency braking command is transmitted to a robot for which the determination has been made (step S815). Then, whether or not a cooperative operation is being performed is determined (step S825). When the cooperative operation is being performed, a robot performing the cooperative operation is identified (step S835), and an emergency braking command is transmitted to the robot or the control device for the robot (step S845). On the other hand, when the cooperative operation is not being performed, the process ends.

In a case where the emergency stop is not required in step S810, the next processing is performed in a similar manner to the step illustrated in FIG. 4.

When any one of the interlocking stop units 250A and 250B receives, from the collision prediction unit 240A or 240B, the result of the determination such as a change or stop in the trajectory of the robot, the hand stopping trajectory generation unit 310A or 310B included in the interlocking stop unit 250A or 250B determines whether or not data or a program for the hand stopping trajectory is included in the result of the determination (step S820).

In a case where the data or the program for the hand stopping trajectory is not included, the hand stopping trajectory generation unit 310A or 310B determines whether or not it is necessary to stop the hand (step S830).

In a case where it is determined that it is necessary to stop the hand, it is determined whether or not the robot is performing a cooperative operation (step S840).

In a case where it is determined that the cooperative operation is being performed, a robot performing the cooperative operation is identified (step S850). Then, the maximum acceleration of the identified robot is estimated (step S860). Then, a trajectory for stopping the hand is generated based on the maximum acceleration (step S870). In other words, a program or the like for the trajectory for stopping the hand is created.

Then, the program or the like is transmitted to the other robot that is performing the cooperative operation or to the robot control device (step S880).

Next, each of the robots or each of the robot control devices uses the program or the like to generate a stopping trajectory for the joint angle (step S890).

After that, control to stop each of the robots is performed (step S900).

On the other hand, in a case where the data or the program for the hand stopping trajectory is included in step S820, a trajectory for stopping the hand of the other robot following is generated based on the received hand stopping trajectory (step S822). After that, processing in step S890 and S900 is performed.

In addition, in a case where it is determined that the cooperative operation is not being performed in step S840, a trajectory for stopping the hand of the robot is generated (step S842). After that, the processing in step S890 and S900 is performed.

According to the present embodiment, from one of a plurality of robots that perform a cooperative operation, another robot can obtain information regarding a change in a trajectory such as a trajectory for stopping a hand, and the other robot can generate, based on the information, a trajectory for stopping a hand, and perform an operation of changing a trajectory, such as a stop operation while keeping a distance between the hands.

Second Embodiment

Figure 9:
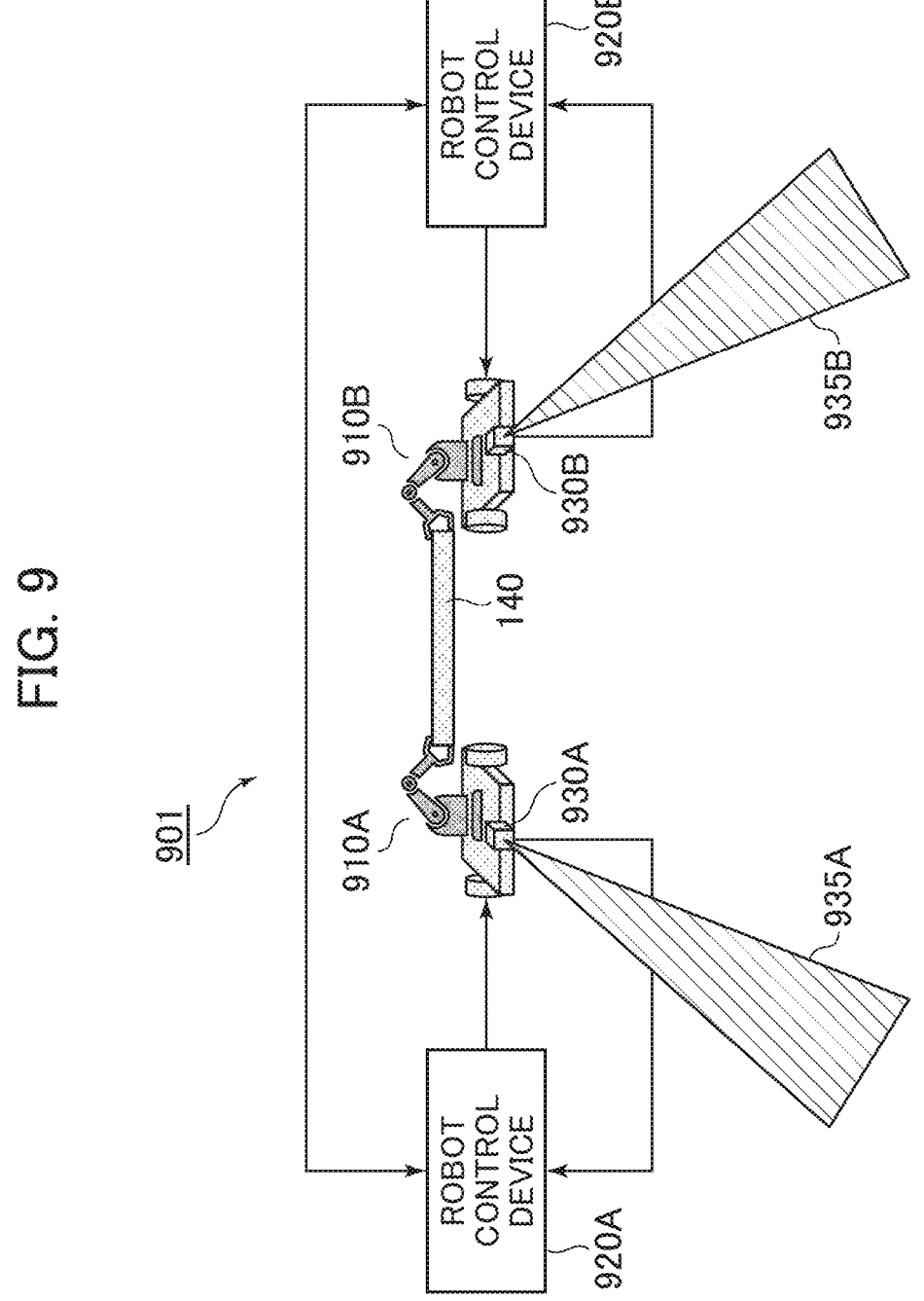
FIG. 9 is a schematic configuration diagram illustrating a robot system according to a second embodiment.

FIG. 9 is a schematic configuration diagram illustrating a robot system according to a second embodiment.

In the drawing, the robot system 901 includes a first robot 910A, a second robot 910B, a robot control device 920A that controls the first robot 910A, and a second robot control device 920B that controls the second robot 910B.

Each of the first robot 910A and the second robot 910B includes wheels (wheels for movement) and can move. The first robot 910A includes a sensor 930A. The second robot 910B includes a sensor 930B. The sensor 930A has a field of view 935A and can monitor a direction of movement of the first robot 910A. The sensor 930B has a field of view 935B and can monitor a direction of movement of the second robot 910B.

The first robot 910A and the second robot 910B cooperate with each other to move the conveyance target object 140. In this case, the first robot 910A and the second robot 910B grip both end portions and the like of the conveyance target object 140.

In other words, the first robot 910A and the second robot 910B move forward at a constant speed with the sensors 930A and 930B at the front such that the conveyance target object 140 does not drop.

The robot control device 920A and the robot control device 920B are configured to be able to transmit and receive data to and from each other. In addition, the robot control device 920A can receive data obtained by the sensor 930A. The robot control device 920B can receive data obtained by the sensor 930B.

Figure 10:
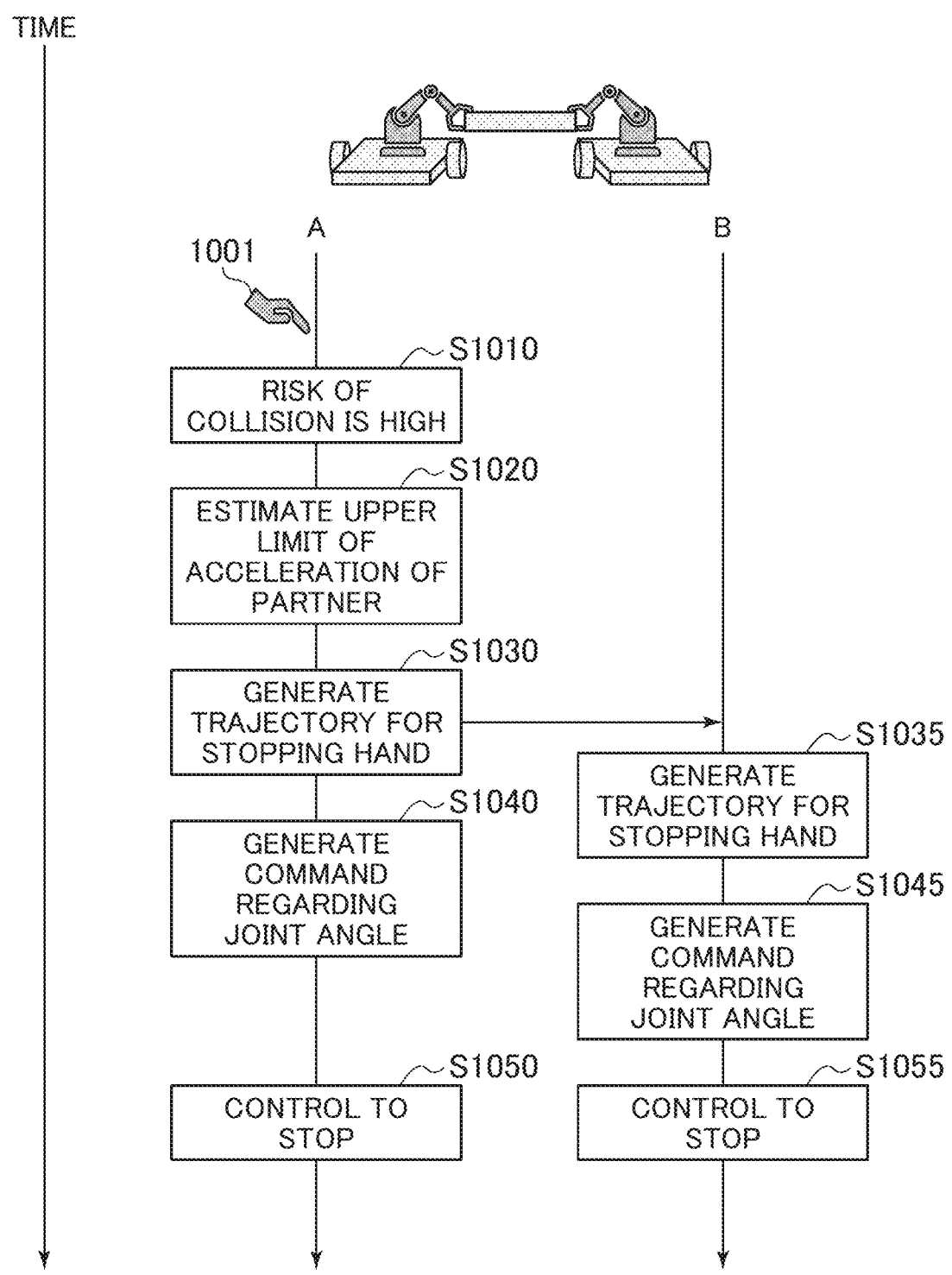
FIG. 10 is a flowchart illustrating a stop process when a disturbance occurs.

FIG. 10 is a flowchart illustrating a stop process when a disturbance occurs.

The robots corresponding to the drawing includes the wheels and can move, and are connected to the robot control devices having the interlocking stop units illustrated in FIG. 3, like the robot control devices according to the first embodiment.

In FIG. 10, in a case where the collision prediction unit 240A determines that a risk of collision with a disturbance 1001 is high (step S1010), the collision prediction unit 240A estimates the maximum value of acceleration of the robot (partner) performing a cooperative operation (step S1020). Then, the hand stopping trajectory generation unit 310A generates a trajectory for stopping a hand of the first robot 910A and transmits data of the trajectory to the hand stopping trajectory generation unit 310B (step S1030).

The joint angle stopping trajectory generation unit 320A uses the data of the generated trajectory for stopping the hand, to generate a command regarding a joint angle and transmits the command to the stopping trajectory control unit 330A (step S1040). The stopping trajectory control unit 330A performs control based on the trajectory for stopping the hand (step S1050).

On the other hand, the hand stopping trajectory generation unit 310B that has received the data generates a trajectory for stopping a hand of the second robot 910B (step S1035).

The joint angle stopping trajectory generation unit 320B uses the data of the generated trajectory for stopping the hand to generate a command regarding a joint angle and transmits the command to the stopping trajectory control unit 330B (step S1045). The stopping trajectory control unit 330B performs control based on the trajectory for stopping the hand (step S1055).

In the present embodiment, when a robot is moving, one of the interlocking stop units generates a trajectory for stopping the robot and transmits data of the trajectory for stopping to the other interlocking stop unit in order to stop the movement. The other robot can stop in conjunction.

It is desirable that a command regarding the wheels include point sequence data of a rotation speed, rotation acceleration, or rotation angle of the wheels for stopping.

Third Embodiment

Figure 11:
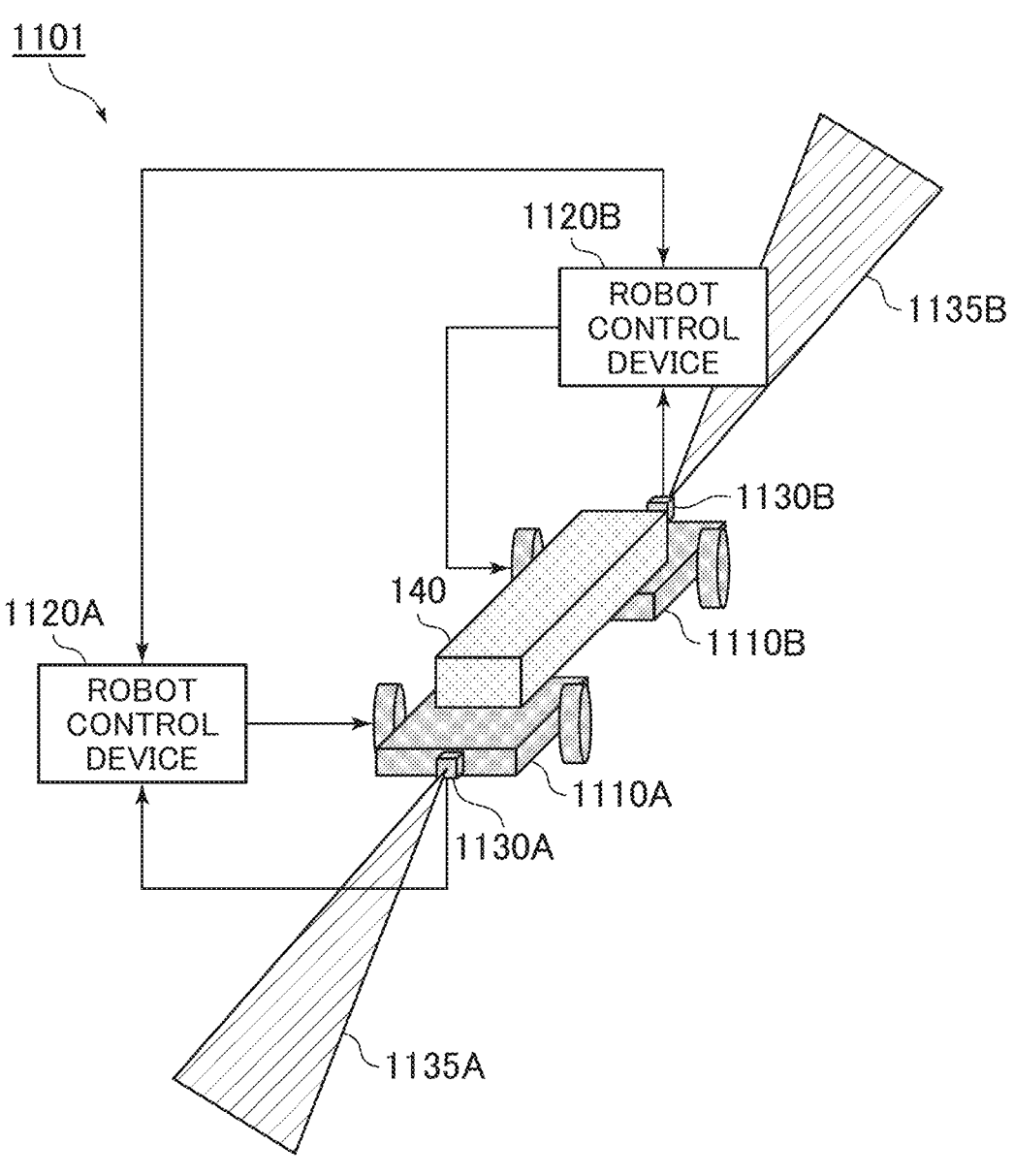
FIG. 11 is a schematic configuration diagram illustrating a robot system according to a third embodiment.

FIG. 11 is a schematic configuration diagram illustrating a robot system according to a third embodiment.

In the drawing, the robot system 1101 includes a first robot 1110A, a second robot 1110B, a robot control device 1120A that controls the first robot 1110A, and a robot control device 1120B that controls the second robot 1110B.

Each of the first robot 1110A and the second robot 1110B includes wheels and can move. The first robot 1110A includes a sensor 1130A. The second robot 1110B includes a sensor 1130B. The sensor 1130A has a field of view 1135A and can monitor a direction of movement of the first robot 1110A. The sensor 1130B has a field of view 1135B and can monitor a direction (backward) opposite to the direction of the movement of the second robot 1110A.

The first robot 1110A and the second robot 1110B cooperate with each other to move the conveyance target object 140. In this case, the first robot 1110A and the second robot 1110B support a lower surface such as both end portions of the loaded conveyance target object 140. In the present embodiment, a cooperative operation is an operation in which two or more robots perform a conveyance operation or the like while simultaneously supporting a single object or the like on loading portions.

In other words, the first robot 1110A and the second robot 1110B move forward at a constant speed with the sensor 1130A of the first robot 1110A being at the front such that the conveyance target object 140 does not drop.

The robot control device 1120A and the robot control device 1120B are configured to be able to transmit and receive data to and from each other. In addition, the robot control device 1120A can receive data or the like obtained by sensor 1130A. The robot control device 1120B can receive data or the like obtained by the sensor 1130B.

Figure 12:
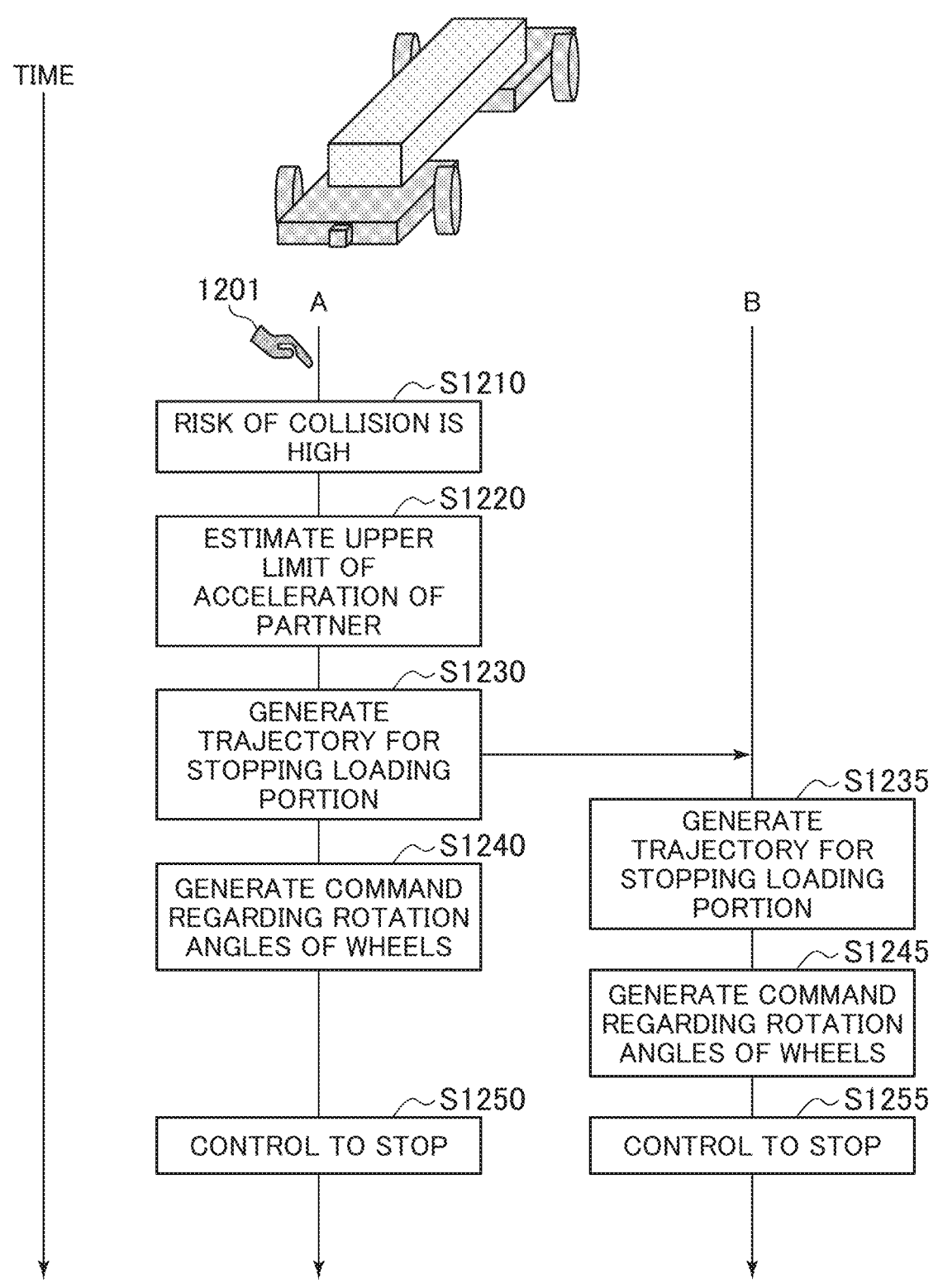
FIG. 12 is a flowchart illustrating a stop process when a disturbance occurs.

FIG. 12 is a flowchart illustrating a stop process when a disturbance occurs.

The robots corresponding to the drawing are connected to the robot control devices having the interlocking stop units illustrated in FIG. 3, as similar to the robot control device of Embodiment 1, except that the robots corresponding to this drawing have the loading portions without having hands (gripping portions) and have wheels and can move.

In FIG. 12, in a case where the collision prediction unit 240A determines that a risk of collision with a disturbance 1201 is high (step S1210), the collision prediction unit 240A estimates the maximum value of acceleration of the robot (partner) performing a cooperative operation (step S1220). Then, a loading portion stopping trajectory generation unit that has a function similar to that of the hand stopping trajectory generation unit 310A generates a trajectory for stopping the loading portion of the first robot 1110A and transmits data of the trajectory to a loading portion stopping trajectory generation unit of the second robot 1110B (step S1230).

A wheel stopping trajectory generation unit that has a function similar to that of the joint angle stopping trajectory generation unit 320A uses the data of the generated trajectory for stopping the loading portion, to generate a command regarding the wheels and transmits the command to the stopping trajectory control unit 330A (step S1240). The stopping trajectory control unit 330A performs control based on the trajectory for stopping the loading portion (step S1250). It is desirable that the command regarding the wheels includes point sequence data of a rotation speed, rotation acceleration, or a rotation angle of the wheels for stopping.

Meanwhile, the loading portion stopping trajectory generation unit of the second robot 1110B that has received the data generates a trajectory for stopping the loading portion of the second robot 1110B (step S1235).

The loading portion stopping trajectory generation unit of the second robot 1110B uses the data of the generated trajectory for stopping the loading portion, to generate a command regarding the wheels and transmits the command to the stopping trajectory control unit 330B (step S1245). The stopping trajectory control unit 330B performs control based on the trajectory for stopping the loading portion (step S1255).

In the first to third embodiments, although the trajectory for stopping the hand or the loading portion is generated, the functions are common in that the conveyance target object is supported, and thus the hand and the loading portion are collectively referred to as a "supporting portion". In addition, the operations of avoiding dropping of the conveyance target object, damage to the conveyance target object, and the like, and changing or stopping of a trajectory and the like, that is, the operations of avoiding a disturbance, are collectively referred to as a "disturbance avoidance operation", and trajectories of the components accompanying the operation are collectively referred to as a "disturbance avoidance trajectory".

REFERENCE SIGNS LIST

100: robot system
110A: first robot
110B: second robot
120A, 120B: robot control device
130: sensor
140: conveyance target object
210: high-level controller
220A, 220B: trajectory planning unit
230A, 230B: control unit
240A, 240B: collision prediction unit
250A, 250B: interlocking stop unit
310A, 310B: hand stopping trajectory generation unit
320A, 320B: joint angle stopping trajectory generation unit
330A, 330B: stopping trajectory control unit
510: storage device
520: arm specification identification unit
530: arm velocity/acceleration upper limit calculation unit
601: disturbance

The invention claimed is:
1. A robot system comprising:
a first robot;
a second robot configured to perform a cooperative operation with the first robot, wherein the cooperative operation comprises supporting of a single target object;
a sensor; and
a control device comprising a processor configured to:
receive, from the sensor, information indicating presence or approach of a disturbance in a predefined trajectory of at least one of the first robot or the second robot;
predict, based on the information, a collision of the first robot or the second robot with the disturbance during the cooperative operation;

generate, responsive to predicting the collision, avoidance trajectory data according to at least a maximum acceleration of at least one of the first robot or the second robot, the avoidance trajectory data comprising an avoidance trajectory for a portion of at least one of the first robot or the second robot to avoid the disturbance or maintain support of the single target object during the present or approach of the disturbance; and transmit the avoidance trajectory data to the first robot and the second robot, wherein the first robot and the second robot execute the avoidance trajectory responsive to the avoidance trajectory data.

2. The robot system according to claim 1, wherein the processor is configured to:

identify that another robot performing the cooperative operation with the first robot is the second robot.

3. The robot system according to claim 1, wherein the avoidance trajectory comprises is a trajectory of supporting portions of the first robot and the second robot.

4. The robot system according to claim 3, wherein the supporting portions are hands or loading portions.

5. The robot system according to claim 1, wherein the the processor is configured to:

estimate the maximum acceleration of at least one of the first robot or the second robot.

6. The robot system according to claim 1, wherein each of the first robot and the second robot includes a manipulator having a joint portion.

7. The robot system according to claim 1, wherein each of the first robot and the second robot includes wheels for movement.

8. A robot control device that controls a cooperative operation of a robot, the robot control device comprising:

a processor configured to:

plan an operation of the robot;

perform the operation of the robot;

receive, from a sensor, information indicating presence or approach of a disturbance in a predefined trajectory of at least one of the robot or another robot;

predict, based on the information, collision of the robot or the other robot with a disturbance during the cooperative operation, the cooperative operation comprises supporting of a single target object;

generate, responsive to predicting the collision, avoidance trajectory data for the robot according to at least a maximum acceleration of at least one of the robot or the other robot, the avoidance trajectory data comprising an avoidance trajectory for a portion of at least one of the robot or the other robot to avoid the disturbance or maintain support of the single target object during the present or approach of the disturbance; and transmit the avoidance trajectory data to the other robot, wherein the robot and the other robot execute the avoidance trajectory responsive to the avoidance trajectory data.

9. The robot control device according to claim 8, wherein a processor configured to:

identify the other robot that performs the cooperative operation together with the robot.

* * * * *